3,053,823
COPOLYMERS OF HEXAFLUOROPROPYLENE
AND FLUORANIL
Warren John Brehm and Alwin S. Milian, Wilmington, Del., assignors to E. I. du Pont de Nemours and Company, Wilmington, Del., a corporation of Delaware
No Drawing. Filed Nov. 10, 1959, Ser. No. 851,965
4 Claims. (Cl. 260—92.1)

The present invention relates to novel fluorocarbon polymers, and, more, particularly, to novel fluorocarbon polyethers.

In accordance with the present invention, there are provided novel fluorocarbon polyethers in the form of copolymers of hexafluoropropylene and fluoranil. The copolymers of the present invention are believed to have the following general formula

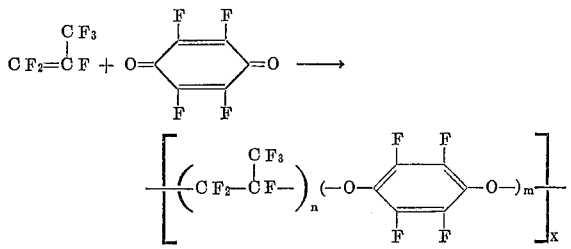

where $n$ is the number of hexafluoropropylene units and $m$ the number of fluoranil units in the polymer chain section having one hexafluoropropylene fluoranil bond, and $x$ represents the number of polymer chain sections in the copolymer.

The novel copolymers of the present invention are obtained by heating a mixture of the fluoranil and hexafluoropropylene at temperatures of 200° to 400° C., and pressures above 1500 atmospheres. Neither a catalyst nor a solvent is necessary for the formation of the polymer. In general, however, the polymerization is carried out in the presence of a fluorocarbon solvent, since a purer product can be obtained in that way. Suitable fluorocarbon solvents comprise perfluorinated hydrocarbons and perfluorinated hydrocarbon ethers such as perfluorocyclohexane, perfluoroheptane, perfluorodimethyl cyclobutane, diperfluorobutyl ether and the like. Similarly, a free-radical forming perfluorinated catalyst, such as bis-(trifluoromethylthio)mercury may also be employed if desired. The ratio of monomers employed is not critical to the formation of the novel copolymer, although it may have an effect on the molecular structure of the copolymer. Preferred polymerization temperatures range from 200 to 250° C. and preferred pressures are from 1500 to 5,000 atmospheres.

The preparation of hexafluoropropylene is well known in the art and requires no further description. The fluoranil employed as comonomer may be obtained by the method described by Wallenfels et al., Chemische Berichte, vol. 90, page 2819 (1957).

The molecular weight of the copolymers of the present invention may be varied to result in products ranging from greases and waxes to high molecular weight resins. The greases and waxes find utility as lubricating materials, particularly in applications involving high temperatures and/or a corrosive environment. The high molecular weight resins are useful for fabrication into film and fiber having the outstanding noncorrosive properties of fluorocarbon polymers. Films and fibers are prepared by fabrication techniques developed for thermoplastic resins.

The present invention is further illustrated by the following examples.

*Example I*

Into a thin, approximately 10 ml. platinum tube equipped with a sealing device was charged 3.0 g. of fluoranil, and 745 ml. of gaseous hexafluoropropylene at room temperature was then condensed into the tube. The tube was sealed and placed into an autoclave which was pressured to 4000 atmospheres with nitrogen and heated to a temperature of 225° C. The polymerization was allowed to proceed for ten hours under these conditions. The tube was then removed from the autoclave and placed in a Dry Ice bath, opened and allowed to come to room temperature. From the tube there was then isolated a yellow solid, a sample of which was digested with chloroform to remove the unreacted fluoranil. Combustion analysis of the dried residue yielded 33.5% carbon and 57.9% fluorine. The calculated values for $C_9F_{10}O_2$, the empirical formula of the 1:1 copolymer, are 32.7% carbon and 57.6% fluorine.

*Example II*

Employing the equipment described in Example I, 390 ml. of gaseous hexafluoropropylene at room temperature and 2.80 g. of fluoranil were polymerized at a temperature of 225° C. and at a pressure of 3000 atmospheres for a period of 7 hrs. From the tube there was isolated 4.42 g. of a yellow solid which was digested with chloroform to remove unreacted fluoranil. The resulting dried copolymer was found to have an inherent viscosity of 0.145 as measured at 75° C. in a 0.49% solution in "Fluorolube-S," a commercially available mixture of fluorocarbons. An infrared spectrum of a film of this copolymer showed bands very similar to those observed in the spectrum of tetrafluorohydroquinone in the 6.6 to 6.8 micron region.

*Example III*

Employing the equipment described in the preceding example, 249 cm.³ of hexafluoropropylene gas and 2 g. of fluoranil were polymerized in the presence of 4.0 ml. of perfluorodimethyl cyclobutane at a temperature of 225° C. and at a pressure of 3000 atmospheres for a period of 8 hrs. On digestion with chloroform, there was obtained a white copolymer of hexafluoropropylene and fluoranil having an inherent viscosity of 0.143 measured as described above. The copolymer was cast from a solution in symmetrical difluorotetrachloroethane to give rise to a stiff, clear and transparent, self-supporting film. The copolymer softened at temperatures above 100° C. and could be cold drawn into fibers.

We claim:
1. A copolymer of hexafluoropropylene and fluoranil, said copolymer consisting essentially of hexafluoropropyl- ene units having the formula —CF(CF$_3$)—CF$_2$—, and fluoranil units having the structure

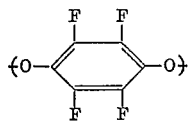

in a 1:1 ratio.

2. The process of preparing copolymers of hexafluoropropylene and fluoranil which comprises heating a mixture thereof to a temperature within the range of 200° to 400° C. at a pressure of at least 1500 atmospheres.

3. The copolymer set forth in claim 1 in film form.

4. The copolymer of claim 1 in fiber form.

References Cited in the file of this patent

UNITED STATES PATENTS

| | | |
|---|---|---|
| 2,938,889 | Krespan | May 31, 1960 |
| 2,952,669 | Bro | Sept. 13, 1960 |
| 2,955,099 | Mallouk et al. | Oct. 4, 1960 |
| 2,988,542 | Bro et al. | June 13, 1961 |

OTHER REFERENCES

Breitenbach et al.: Can. J. Research 28B, 507–13 (1950). (Copy in Scientific Library.)

Hauptschein et al.: J. Am. Chem. Soc., 78, 676–9 (1956). (Copy in Scientific Library.)

Wallenfels et al.: Ber., 90, 2819–32 (1957). (Copy in Division 6.)

UNITED STATES PATENT OFFICE
CERTIFICATE OF CORRECTION

Patent No. 3,053,823                           September 11, 1962

Warren John Brehm et al.

It is hereby certified that error appears in the above numbered patent requiring correction and that the said Letters Patent should read as corrected below.

Column 2, line 39, for "0.49%" read -- 0.494% --.

Signed and sealed this 1st day of January 1963.

SEAL)
ttest:

ERNEST W. SWIDER
Attesting Officer

DAVID L. LADD
Commissioner of Patents